(12) United States Patent
Soudhamma et al.

(10) Patent No.: US 11,895,142 B2
(45) Date of Patent: *Feb. 6, 2024

(54) COMPUTER-BASED PLATFORMS CONFIGURED FOR AUTOMATED EARLY-STAGE APPLICATION SECURITY MONITORING AND METHODS OF USE THEREOF

(71) Applicant: American Express Travel Related Services Company, Inc., New York, NY (US)

(72) Inventors: Asish Soudhamma, Peoria, AZ (US); Dilip Kumar, Phoenix, AZ (US); Pratik Rajendraprasad Kasat, Phoenix, AZ (US); Andrew Michael Zammit, Scottsdale, AZ (US); Gregory Huff, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,093

(22) Filed: Dec. 21, 2022

(65) Prior Publication Data

US 2023/0126950 A1    Apr. 27, 2023

Related U.S. Application Data

(63) Continuation of application No. 16/837,962, filed on Apr. 1, 2020, now Pat. No. 11,552,979.

(51) Int. Cl.
*H04L 9/40* (2022.01)
*H04L 45/00* (2022.01)
*G06F 16/25* (2019.01)
*H04L 45/121* (2022.01)
*G06F 16/2457* (2019.01)
*G06F 21/57* (2013.01)

(52) U.S. Cl.
CPC .... *H04L 63/1433* (2013.01); *G06F 16/24573* (2019.01); *G06F 16/25* (2019.01); *G06F 21/577* (2013.01); *H04L 45/121* (2013.01); *H04L 45/22* (2013.01); *H04L 45/38* (2013.01)

(58) Field of Classification Search
CPC ........ G06F 16/25; G06F 21/577; G06F 21/50; G06F 21/56; G06F 21/562; G06F 21/563; G06F 21/567; G06F 21/57
See application file for complete search history.

(56) References Cited

U.S. PATENT DOCUMENTS

2009/0089591 A1*  4/2009  Mattsson ............ G06F 21/6236
                                                      713/193
2012/0110174 A1*  5/2012  Wootton ............. H04L 63/1416
                                                      709/224

OTHER PUBLICATIONS

Utility U.S. Appl. No. 16/837,962, filed Apr. 1, 2020, entitled "Computer-Based Platforms Configured for Automated Early-Stage Application Security Monitoring and Methods of Use Thereof," Inventors: Asish Soudhamma et al. (Not Published).

* cited by examiner

*Primary Examiner* — Edward Zee
(74) *Attorney, Agent, or Firm* — Sterne, Kessler, Goldstein & Fox P.L.L.C.

(57) ABSTRACT

The systems and methods disclosed herein comprise computer-based platforms configured for automated early-stage application security monitoring for allowing users (e.g., application developers) to make decisions at the early stage of the application development.

20 Claims, 8 Drawing Sheets

COMPUTER-BASED PLATFORMS CONFIGURED FOR AUTOMATED EARLY-STAGE APPLICATION SECURITY MONITORING AND METHODS OF USE THEREOF

CLAIM OF PRIORITY

This application claims priority to U.S. Nonprovisional patent application Ser. No. 16/837,962, filed Apr. 1, 2020, entitled "COMPUTER-BASED PLATFORMS CONFIGURED FOR AUTOMATED EARLY-STAGE APPLICATION SECURITY MONITORING AND METHODS OF USE THEREOF," which is incorporated herein by reference in its entirety.

BACKGROUND OF TECHNOLOGY

A computer network system may include a group of computer systems and other computing hardware devices that are linked together through communication channels to facilitate communication and resource sharing among a wide range of users.

SUMMARY OF DESCRIBED SUBJECT MATTER

In some embodiments, the present disclosure provides various examples of technically improved computer-implemented platforms, systems and methods, including methods for receiving, by at least one processor, at least one message from a first message store comprising at least one storage device; determining, by the at least one processor, a scan profile of each file associated with each message of the at least one message based at least in part on metadata of each message; determining, by the at least one processor, at least one target queue for each message of the at least one message based on each scan profile; wherein each target queue is associated with a scanner of at least one scanner for scanning the file associated with each message; modifying, by the at least one processor, each message of the at least one message with event-carried state data; replicating, by the at least one processor, each message of the at least one message across each target queue of each scanner to form a queue-specific message of each message; scanning, by the at least one processor, each file by each scanner associated with each target queue of each queue-specific message; recording, by the at least one processor, results from each scanner in the event-carried state data of each queue-specific message; merging, by the at least one processor, the event-carried state data of each queue-specific message of each message into a result record of each message associated with each file; and storing, by the at least one processor, each result record of each message in at least one second message store.

In some embodiments, the present disclosure also provides examples of technically improved computer-based systems and computer-readable media, including media implemented with and/or involving one or more software applications provided for download via a server and/or executed in connection with at least one network such as via, e.g., a web browser, web application, or native application, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
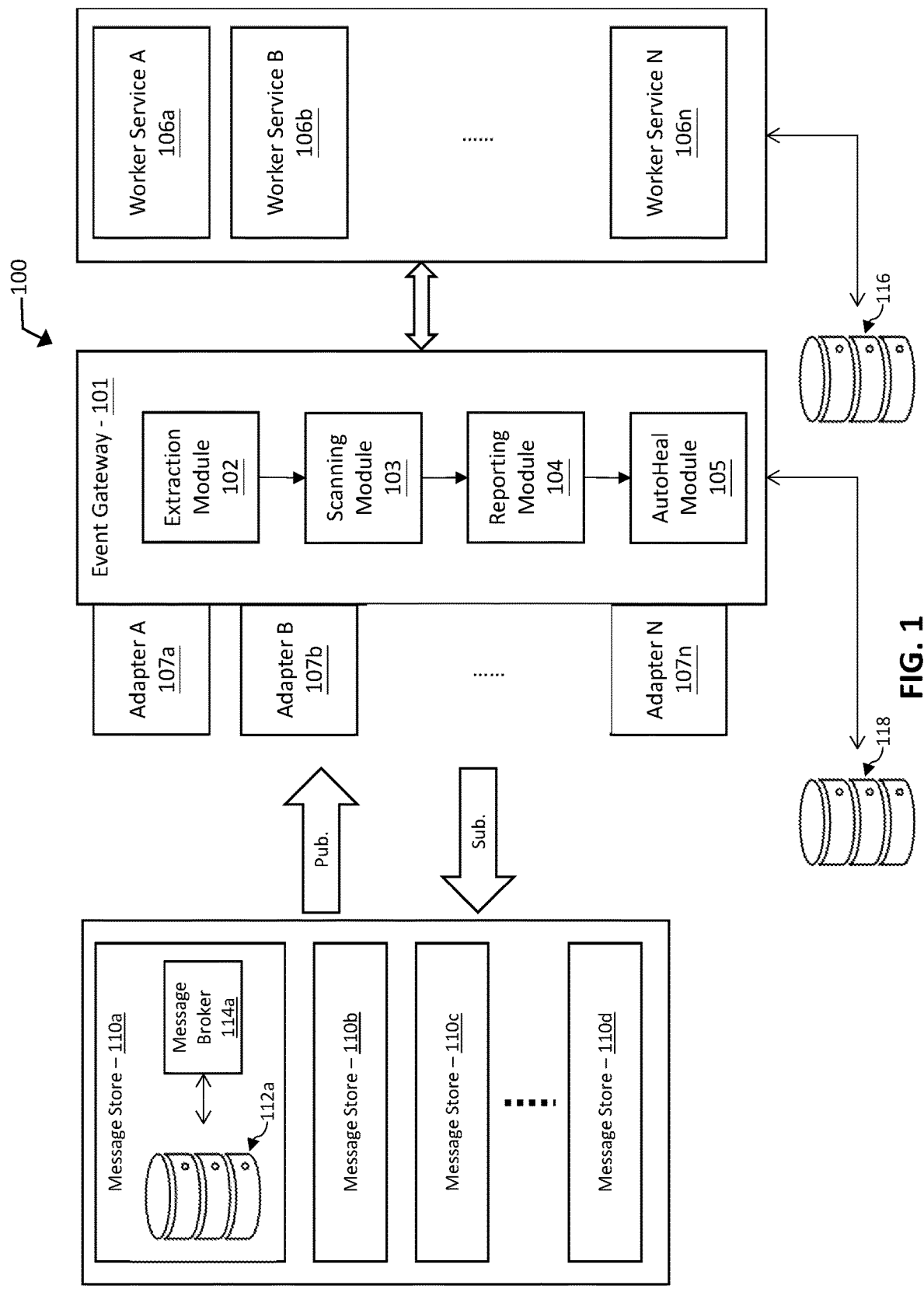
FIG. 1 is a block diagram depicting an example of a computer-based platform configured for automated early-stage application security monitoring, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given associated with the various embodiments of the present disclosure is intended to be illustrative, and not restrictive.

As used and referenced herein, the terms "automated" and "automatically," and their logical and/or linguistic relatives and/or derivatives, may refer to computer-based events and/or actions that can be triggered and/or occur without any human intervention. In some embodiments, events and/or actions in accordance with the present disclosure can be in real-time, near real-time, and/or based on a predetermined periodicity of at least one of: nanosecond, several nanoseconds, millisecond, several milliseconds, second, several seconds, minute, several minutes, hourly, several hours, daily, several days, weekly, monthly, etc.

As used and referenced herein, the term "runtime" may refer to any behavior that is dynamically determined during an execution of a software application or at least a portion of a software application.

As used and referenced herein, the terms "computer engine" and "engine" may refer to at least one software component and/or a combination of at least one software component and at least one hardware component which are designed/programmed/configured to manage/control other software and/or hardware components (such as libraries, software development kits (SDKs), objects, etc.).

As used and referenced herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

As used and referenced herein, the term "cloud" and similar terms may refer to at least one of the following: (1) a large number of computers connected through a real-time communication network (e.g., Internet); (2) providing the ability to run a program or application on many connected computers (e.g., physical machines, virtual machines (VMs), etc.) at the same time; (3) network-based services, which appear to be provided by real server hardware, and are in fact served up by virtual hardware (e.g., virtual servers), simulated by software running on one or more real machines (e.g., allowing movement and scale up (or down) on the fly without affecting the end user).

As used and referenced herein, the term "user" may refer to at least one user. In some embodiments, the term "user" should be understood to refer to a developer of an application or applications as described herein and/or a consumer of data supplied by a data provider. By way of example, and not limitation, the terms "user" can refer to a person who receives data provided by the data or service provider over the Internet in a browser session or can refer to an automated software application which receives the data and stores or processes the data.

As used and referenced herein, the term "message" may refer to one or more electronic communication between different computing applications or computing devices.

As used and referenced herein, the term "message broker" may refer to a computer-based architectural pattern for message validation, message transformation, and/or message routing. In some instances, a "message broker" may mediate communication among applications, minimizing the mutual awareness that applications should have of each other to exchange messages, effectively implementing decoupling.

As used and referenced herein, the term "worker service" may refer to a computer application configured to, for example, intercept network requests, caching or retrieving resources from a cache memory, develop push messages, or other suitable computations.

The aforementioned examples are, of course, illustrative and not restrictive.

Described herein are methods, systems, computer readable media, etc. comprising computer-based platforms configured for automated, early-stage application security monitoring allowing users (e.g., application developers) to make decisions at the early stage of application development through monitoring, alerting, and reporting processes. For example, the disclosed system can collect metadata about open-source usage, sensitive data exposure, and runtime details, while providing rapid feedback with recommendations to developers on risk posture. Therefore, the present disclosure system can enhance the developer experience and foster security. In some embodiments, the present disclosure system can analyze thousands of applications across the enterprise and constructs holistic application profiles comprising source code, data sources, and runtime details. Therefore, the present disclosure system can help engineering teams to receive early and ongoing feedback regarding the security posture of their application at the earliest point of development. In some embodiments, the present disclosure system can display details about vulnerabilities, introduced through third-party software dependencies, and exposure of sensitive data in source code in a clear and concise way and provide at-a-glance awareness of security issues in an application.

In some embodiments, the present disclosure system can adopt the core Information Security principle of shifting security into the hands of engineers and gives them insights about applications at the earliest relieving release friction. In some embodiments, the present disclosure platform can provide live insights and near real-time feedback about each application. For example, users can use these insights to make changes to their application at early phases of development and reduce the cost of rework, thus minimizing the time to market. Therefore, ramp-up and onboarding can be eliminated since all applications are automatically enrolled by utilizing standard enterprise, source-control solutions, instantly enabling technology-unit-wide security capabilities and awareness. In some embodiments, such as open-source usage, the present disclosure system can provide remediation recommendations, thus reducing the burden of solution discovery on application teams.

In some embodiments, the present disclosure system can include dashboards and reports providing great information about application health in the enterprise, which application teams can use to make changes to their application at early phases of development and reduce the cost of rework. For example, each application security vulnerability may be expensive to fix in a production environment. Therefore, implementing a fix prior to the production stage reduces a need to rework with changes, ultimately reducing time and costs. In some embodiments, the system can generate reports on sensitive data exposure to help teams identify the exposure in their source code and to avoid storing any customer or system information in source code. For example, the present disclosure can avoid any potential impact by exposing card member or enterprise system information accidently outside of the entity (e.g., financial institutions). In other words, those early results can show an effective increase in the team's operational throughput by parallelizing much of the implementation workload.

For example, the discovery of open-source components and the detection of sensitive data being leaked into source code at an early stage of software development allows various embodiments of the present disclosure to assess the entity's open-source vulnerability footprint (with the ability to pinpoint usage within each application) and remediate the leakage of sensitive data. In some embodiments, the present disclosure system can help in detecting, preventing, and quickly responding to an information security breach situation. In some embodiments, from end to end, various embodiments of the present disclosure can be purely cloud-native. For example, the system and methods of the present disclosure may deploy its network via Infrastructure-as-Code to various compute and storage solutions including cloud service providers. Accordingly, flexibility for running the system on enterprise platforms, commodity platforms, or both among other platforms and combinations thereof to facilitate cost minimization and improved development efficiency. Moreover, the system and methods of the present disclosure may handle events by using NoSQL document databases backed by distributed persistent storage. These solutions aim to optimize resource utilization, maximize capacity, guarantee high availability, and allow continuous fast delivery. All of the solutions above are contributing factors to minimize the cost. For example, the present disclosure system can drive a wider adoption via innersource (e.g., as discovered with inductive reasoning concerning whether a source code is open-source, and if not, then inner-source) within the enterprise benefiting all technology teams from sharing production, toolchain, and implementation knowledge.

Illustrative Implementations of at Least Some Embodiments

FIG. 1 is a block diagram depicting an example of a computer-based platform configured for automated early-stage application security monitoring, in accordance with one or more embodiments of the present disclosure. For example, an illustrative platform 100 in accordance with at least some embodiments of the present disclosure can be implemented to provide early-stage application security monitoring for allowing users (e.g., application developers) to make decisions at the early-stage of the application development through monitoring, alerting, and reporting processes. In some embodiments, the platform 100 can include message stores A-N (110a-110n), a particularly programmed computing component ("event gateway") 101, and worker services A-N (106a-106n).

In some embodiments, some or all of the message stores 110a-110n can include a data storage system 112a and a message broker 114a, as depicted for message store 110a. However, each of the message stores 110b-110n can include similar data storage systems and message brokers to message store 110a, or other message store arrangements. In some embodiments, the data storage system 112a can include, e.g., a suitable system or device for persistently storing data, including maintaining electronic records, archiving data, storing files, storing objects, or other storage tasks. As such, the data storage system 112a can include, e.g., one or more databases, hard-drives, solid-state drives, repositories, cloud-storage platforms, or other suitable data storage solutions.

In some embodiments, to facilitate the ingestion of data stored in the data storage system 112a, messaging adapters, e.g., adapter A 107a through adapter N 107n, may be employed to pair with the message stores 110a-110n to validate, transform and route messages from the message stores 110a-110n to the event gateway 101. For example, the event gateway 101 may ingest data from the data storage system 112a via the pairing of a particular adapter of the adapters A-N 107a-107n with the message broker 114a. In some embodiments, the message broker 114a may broker messages including, e.g., files, data, source code commits/changes, documents, among other information received from the data storage system 112a using, e.g., a publish/subscribe messaging pattern. A publish/subscribe messaging pattern can include the message broker 114a categorizing published messages into classes. An adapter of the adapters 107a-107n may be configured to subscribe to particular classes of messages. Based on the subscription, the message broker 114a may automatically provide messages to the one or more adapters of the adapters 107a-107n based on the subscribed classes.

In some embodiments, the adapters 107a-107b may each be configured for distinct class subscriptions or sets of class subscriptions. However, each message store 110a-110n may use different messaging formats, interfaces or protocols. Thus, to facilitate greater interoperability, the adapters 107a-107n may each be configured for a particular format, interface or protocol, with each adapter subscribing to the same or different classes of messages. For example, the adapters 107a-107n may each include a particular application programming interface (API) or message broker that matches one or more of the message stores 110a-110n. For example, the message broker 114a may utilize a suitable message brokering component, such as, e.g., RabbitMQ using Advanced Message Queuing Protocol (AMQP) over Transmission Control Protocol (TCP), or HyperText Transfer Protocol (HTTP) over TCP broker, or any other suitable message broker 114a using, e.g., TCP, UDP, HTTP, or other protocol and combinations thereof. Thus, an adapter of the adapters 107a-107n may be configured to subscribe to message classes via the message broker 114a.

Each message store 110a-110n may use any of a variety of data communication formats, such as message brokers, Application Programming Interface APIs, database queries, other data communication and provision techniques. In some embodiments, event gateway 101 may include adapters 107a-107n that are configured to match all of the variety of data communication formats so that regardless of what technique a message store of the message stores 110a-110n uses, the event gateway 101 may ingest messages from that message store.

Examples of message brokers can include, e.g., RabbitMQ, AWS Simple Queue Service, Apache Kafka, Microsoft Azure Service Bus, Open Message Queue, or other suitable message broker. In some embodiments, the message stores 110b-110n may communicate with one or more of the adapters 107a-107n via, e.g., APIs rather than or in addition to message brokers. Thus, the event gateway 101 may receive, via communication between the adapters 107a-107n and the message stores 110a-110n, messages regardless of the messaging protocol or format.

In some embodiments, the event gateway 101 may receive the messages and coordinate them with software services to, e.g., implement stages of scanning, and validate each message. For example, the four main stages for the present disclosure pipeline can include extract, scan, report and auto heal. In some embodiments, the event gateway 101 may include modules for coordinating messages for processing by software services of each of the main stages. For example, where the pipeline includes extract, scan, report and auto heal, the event gateway 101 may include, e.g., an extraction module 102, a scanning module 103, a reporting module 104 and an auto heal module 105.

In some embodiments, each of the extraction module 102, the scanning module 103, the reporting module 104 and the auto heal module 105 may include logic to perform and/or call a worker service of the worker services 106a-106n to perform the stage for each item of data or each message. Thus, the extraction module 102 may ingest a message via an adapter of the adapters 107a-107, to, e.g., extract metadata. The message and extracted metadata may then be used by the scanning module 103 to determine relevant scans and place the message in appropriate queues for processing by worker services of the worker services 106a-106n associated with the relevant scans. The scanned messages may then be used by the reporting module 104 to aggregate the scanning data and report the aggregated data to, e.g., the service database 116. In some embodiments, based on the reported results, the auto heal module 105 may execute an auto heal stage that, e.g., opens a Pull Request (PR) to provide fixes for certain types of vulnerabilities.

In some embodiments, the event gateway 101 may be in communication with a gateway database 118. In some embodiments, the gateway database 118 may include, e.g., a suitable system or device for persistently storing data, including maintaining electronic records, archiving data, storing files, storing objects, or other storage tasks. As such, the gateway database 118 can include, e.g., one or more databases, hard-drives, solid-state drives, repositories, cloud storage platforms, or other suitable data storage solutions. In some embodiments, gateway database 118 may maintain, e.g., configuration files for configuring queuing, backpressure settings, message caching, among other information related to the event gateway 101 and each module 102-105 of the event gateway 118. In some embodiments, the software services can include, e.g., Function-as-a-Service (FaaS) services implemented by, e.g., worker services 106a-106n. In some embodiments, utilizing FaaS allows the system to maximize its resource usage based on work type need, as opposed to worker pools that may sit idle. This is also known as server-less architecture, such as, e.g., AWS Lambda.

In some embodiments, the worker services 106a-106n may be in communication with a service database 116. In some embodiments, the service database 116 may include a suitable system or device for persistently storing data, such as those described above. The service database 116 may provide, e.g., persistent storage of worker service 106a-106n related data. For example, the service database 116 may include, e.g., FaaS configurations and orchestration configurations, including resource and process schedule, as well as data used by and resulting from the worker services 106a-106n. Examples of the data may include, e.g., libraries of known vulnerabilities, libraries of open-source software components, auto heal templates for automatically implementing fixes to identified vulnerabilities and errors, among other data. Moreover, the service database 116 may provide a repository for maintaining scan results for each message, such as, e.g., results reported by a reporting worker service coordinated for messages by the reporting module 104 of the event gateway 101.

In some embodiments, the extraction module 102 may coordinate the messages to extract subject metadata records from the message. For instance, subject metadata can be commits, commit messages, files, file metadata (e.g., file size, type) etc.

In some other embodiments, the scan stage determines and performs relevant scan on the subject (file/commits) based on the subject metadata. In some embodiments, the scanning module 103 may coordinate received messages into scan type queues associated with worker services 106a-106n. In some embodiments, the scan type queues are an abstraction of lambda controller queues, meaning that these queues act as an entry point for work to be done by FaaS. The general "work-to-be-done" queues contain many different task definitions, but adhere to a strict first-dimensional schema, and are thus referred to as "commands."

For example, the report stage persists the information recorded in the message from previous stages into the database for reporting and analysis. In some embodiments, the reporting stage includes merging scan results and storing the merged results in, e.g., a database for persistent storage. However, the reporting stage may further include additional data aggregation to, e.g., relate similar data to the scan results by cross-referencing between independent scanned applications to check for commonalities. Moreover, the reporting stage may include roll-up metrics at various levels (e.g., the scanned application component, the holistic application via multiple components, the business unit or group, and the entire organization/company). The reporting stage may include additional reporting functionality as well. In some embodiments, the reporting module 105 includes two mechanisms to implement the reporting stage: (1) a pre-aggregation mechanism to aggregate data ahead of consumption or reporting, and (2) a real-time aggregation mechanism to aggregate the data on-demand or on request. In some embodiments, the aggregated data for each message, including the merged scan results, may then be output to a service database 116 to maintain records of the scan results for each message. The service database 116 may store the records as well as serve the records via, e.g., a server or cloud platform, to a GUI of a permissioned user at a user computing device. Thus, the user may view and act on the scan results of each message.

For example, the event gateway 101, like a pipeline orchestrator, can facilitate communication between different worker services 106a-106n and message stores 110a-110n. In some embodiments, worker services A-N (106a-106n) can be a microservice or FaaS. In some other embodiments, the function here can be responsible for doing a unit of work. For another example, message stores A-N (110a-110n) can be used for persistence and caching. Accordingly, the present system and the event gateway 101 can form a distributed computing platform where the worker services 106a-106n and the event gateway 101 may be instantiated in a distributed fashion, such as, e.g., using microservices, FaaS, or other distributed computing architecture.

In some embodiments, event gateway 101 can be a configurable and extensible service that facilitates communication between different message stores A-N (110a-110n) (e.g., message broker/database) and worker services A-N (106a-106n). For example, event gateway 101 can act as a bridge between message stores A-N (110a-110n) and worker services A-N (106a-106n), connecting worker services A-N (106a-106n) to the messaging world. In some embodiments, event gateway 101 can enable any worker service 106a-106n to receive a message from any message store 110a-110n without being aware of the underlying messaging protocol. For example, once event gateway 101 receives a message from a message store 110a-110n, event gateway 101 may call the worker service 106a-106n with that message and publishes the result from worker service 106a-106n to either the same message store 110a-110n or a different message store 110a-110n. In some embodiments, event gateway 101 can have standard specifications for input and output to and from worker services 106a-106n, which enables any worker service 106a-106n to leverage event gateway 101 for its purpose. Accordingly, the event gateway 101 serves as an intelligent message bus with strong, specific message controls for intelligently routing and queuing messages.

For instance, event gateway 101 can receive messages from a message store 110a-110n via, e.g., an UDP, TCP or other protocol-based system, and call a worker service 106a-106n with the message. The event gateway 101 may then receive a response from the worker service 106a-106n and send the worker service 106a-106n a response to an appropriate message store 110a-110n, including a suitable protocol-based system or systems, such as, e.g., an Apache Kafka or MongoDB or different queue in RabbitMQ.

In some embodiments, event gateway 101 can be the backbone of the system. The example above shows how it is currently used in the present disclosure system to support message processing through different stages. Thus, the event gateway 101 may be implemented in a distributed fashion to form distributed or federated message queues to worker services 106a-106n (e.g., implemented as microservices or FaaS functions). As a result, the system can be very performant and scalable due the distributed nature. In some embodiments, without additional network latency from HTTP services, the message throughput would be much higher.

In some embodiments, the support for different message brokers in event gateway 101 can be enabled via adapters A-N 107a-107n. For example, these adapters can be reusable modules that can be plugged into event gateway 101 to support additional message stores 110a-110n with declarative configuration. In some embodiments, these adapters 107a-107n implement a standard interface provided by event gateway 101 for feature parity with various message stores 110a-110n. For example, the platform 100 can support RabbitMQ, MongoDB, Apache Kafka using plug-n-play adapters A-N 107a-107n. In some embodiments, the platform 100 can be extended to support more message stores 110a-110n.

For example, event gateway 101 can be entirely driven by declarative configuration and make intelligent routing decisions for each message. In some embodiments, event gateway 101 can implement choreography cloud native design pattern and support a programmable routing configuration to determine which queues in the message store 110a-110n should receive the message. For example, this message can be sent to one or many queues, or no queues at all.

In some embodiments, for each message, event gateway 101 can decide the entity (worker service/message store) that should be called with the message, send a payload of data including a bundle of one or more messages (also referred to as a "micro-batch") to one or more entities, decide what action should be taken based on success/failed response from any entity, retry for failed messages with exponential back off of the message store (e.g., messages are sent to a dead-letter queue (DLQ) when retries are maxed out), deduplicate messages and delay the message delivery to some queues for supported message stores, control message flow via a backpressure mechanism to limit message flow for supported message stores etc. In some embodiments, the payload can be sent, e.g., in bundles of one or more messages, or a streaming basis.

In some embodiments, a message may have a size in a range of between about, e.g., 1 kilobyte and about 10 kilobytes, with an average size of about 5 kilobytes. In some embodiments, a bundle of messages may include all message data from within, e.g., a 15-minute, 20-minute, 30-minute, 45 minute, 60 minutes, 6 hours, 12 hours, or 24 hours' period, or other suitable period. Alternatively, the bundle may include bundles of message data forming a predetermined quantity of data, such as, e.g., on the orders of 1 kilobyte, 10 kilobytes, 100 kilobytes, 1 megabyte, and 10 megabytes, or other amount of data. In some embodiments, regardless of how the bundle is determined, the average bundle size may include between about, e.g., 1 and 1,000 messages, with an average bundle size including about, e.g., 20 messages. In some embodiments, streaming includes the event gateway 101 routing or sending message data to a worker service 103a-103n or message store 105a-105n upon receiving the message data.

In some embodiments, while backpressure allows for load balancing, it also functions as automated flow control of data through the event gateway. Thus, the backpressure mechanism may limit the message flow based on slow-downs in message throughput through the event gateway 101 caused by worker services 103a-103n or message store 105a-105n processing message data slower than other worker services 103a-103n and message stores 105a-105n.

In some embodiments, the worker services 103a-103n may include a Public Key (certificate) scanner which can index various data points from PEM or DER formatted ASN.1 conformant certificates. For example, each discovered certificate can be assigned a severity score associated with a degree of compliance with predetermined practice and policy requirements. In some embodiments, the severity score may be used by application teams to identify the wrong practices and policy violations.

In some embodiments, the Public Key (certificate) scanner can use four different severity groups for policy violations—High, Medium, Low, and None. In addition to assigning the severity, the present system can also calculate the fingerprint of a certificate which can be used to identify the certificate using a unique value across all the source code within the organization. For example, fingerprinting can allow the present system to find the usage of same certificate across multiple applications.

In some embodiments, the worker services 103a-103n may include a service designed to provide fixes to certain types of vulnerabilities and issues. For example, the service can perform auto healing for open-source dependencies by leveraging the powerful real-time monitoring of open-source dependencies. In some embodiments, the service can monitor all dependencies and compare them against a vulnerability database. In some embodiments, where the service does not identify matching vulnerabilities, the dependencies may be inferred and marked as safe versions. However, where vulnerabilities are found, this service may open a Pull Request (PR) for each specific dependency to update the specific dependency to a safest version. For example, the PR can conform to software development best practices and etiquette. In some embodiments, the present system can make sure that the package version updates do not break the application functionality by choosing a safer version closest to the current version, using semantic versioning where applicable. In some embodiments, this, as well as other functional tests, may be performed automatically where available in a source code repository.

In addition to the above, for some embodiments, the worker services 103a-103n may include two additional healing mechanisms: First, fixes for certain types of sensitive data found in source code. For example, the present system can securely initiate migration of certain sensitive data to a secure vault. This will allow application teams to remove any sensitive data from the source code while allowing access to them during application runtime.

Secondly, for example, Patch Web Application Firewall (WAF) may apply rules for network-related attacks. In some embodiments, using code analysis engines, the present system can detect potential network weaknesses present in the source code. For example, once present system identifies the weakness, it can recommend a rule change in the WAF to eliminate or limit those attack vectors. In some embodiments, this can be achieved by making a system call to the Web Application Firewall tool and can confirm the fix by running a specific attack against the application using a Dynamic Application Security Scan tool.

In some embodiments, the worker services 103a-103n may include an inner-source scanner to help identify inner-source codebase (and packages) and understanding the health of the source code.

In some embodiments, the present system can use pipeline architecture for processing all the messages. The pipeline is a term for different stages that each message goes through during its lifecycle. These stages are different queues in the message store and queues are FIFO (i.e., first in first out), an abstraction of FaaS or microservice controller queues, meaning that these queues act as an entry point for work to be done by worker services 106a-106n.

In some embodiments, the present system can use the Pipes and Filters pattern where individual worker services 106a-106n (processors/filters) are joined by message queues (pipes) utilizing the Competing Consumers pattern. For example, messages can adhere to the Event-Carried State Transfer (ECST) pattern, the event can carry all the data needed about the event, which completely de-couples the target system from the system that originates the event, and the pipeline can be regulated via the Queue-Based Load Leveling pattern.

Figure 2:
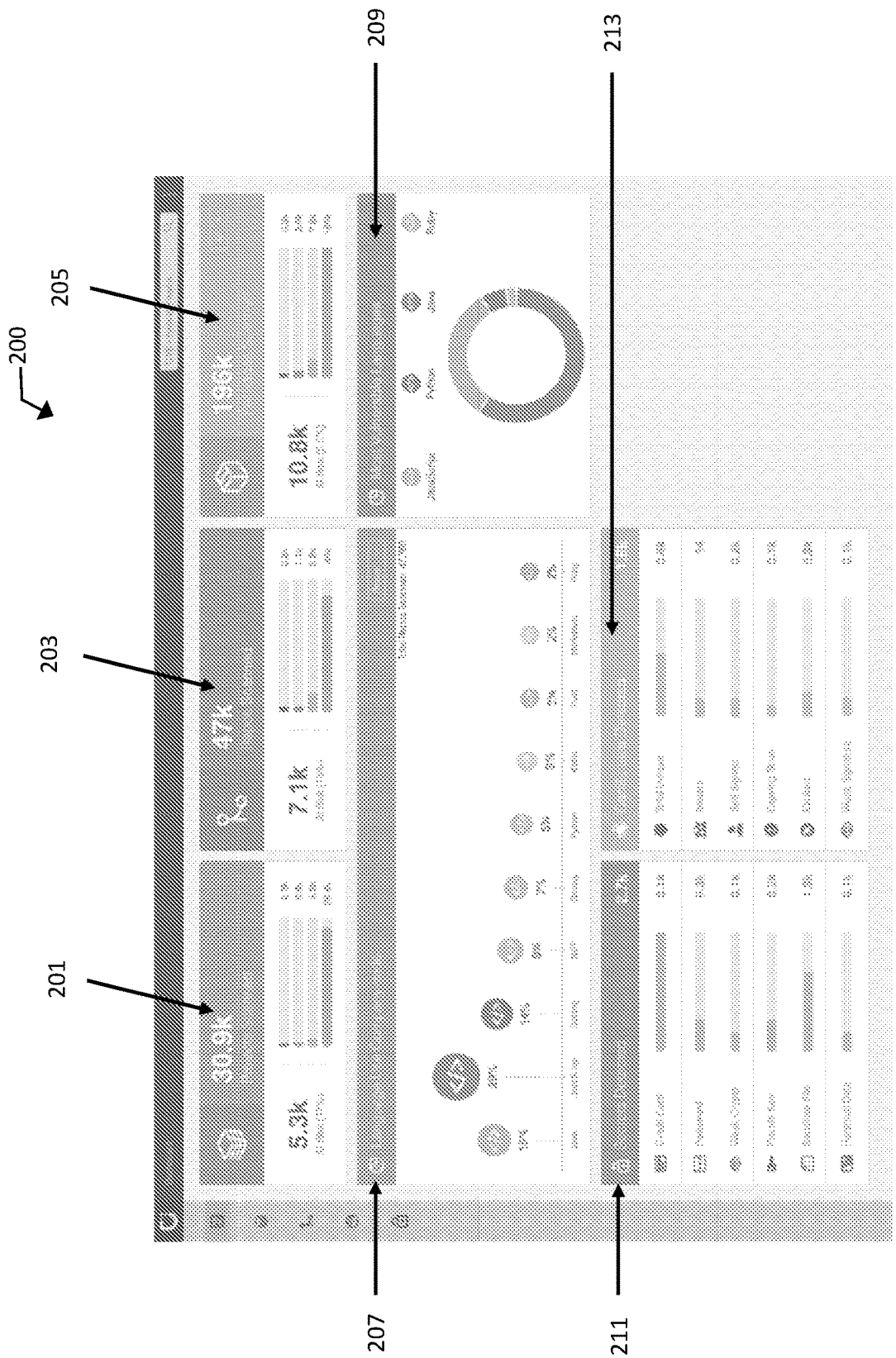
FIG. 2 shows a graphical user interface (GUI) example for displaying automated early-stage application security monitoring results for the user, consistent with examples of aspects of at least some embodiments of the present disclosure.

FIG. 2 shows a GUI example for displaying early-stage application security monitoring results for the user, consistent with examples of aspects of at least some embodiments of the present disclosure. For example, in FIG. 2, the GUI 200 can be implemented to provide the results of the early-stage application security monitoring for allowing users (e.g., application developers) to make decisions at the early-stage of the application development through monitoring, alerting, and reporting processes.

In some embodiments, in FIG. 2, the GUI 200 can display the result of the early-stage application security monitoring including projects scanned 201, repos scanned 203, packages scanned 205, the language (e.g., Java, Binary) used by users 207, most vulnerable languages 209, secrets (e.g., password) detected 211, or certificates (e.g., issuers) detected 213.

For example, the file types can include Binary, Java, JavaScript, XML, JSON, Markdown, Maven POM, Python, etc. In some embodiments, the secrets can include password, credit card information, personal data, private key, sensitive file, etc. In some embodiments, the certificates can include information associated with, e.g., total unique certificates, certificate issuers, self-signed certificates, certificates with weak signatures, certificates expiring soon (e.g., within a day, within a week, within a month, within a year, etc.), expired, etc.

Figure 3A:
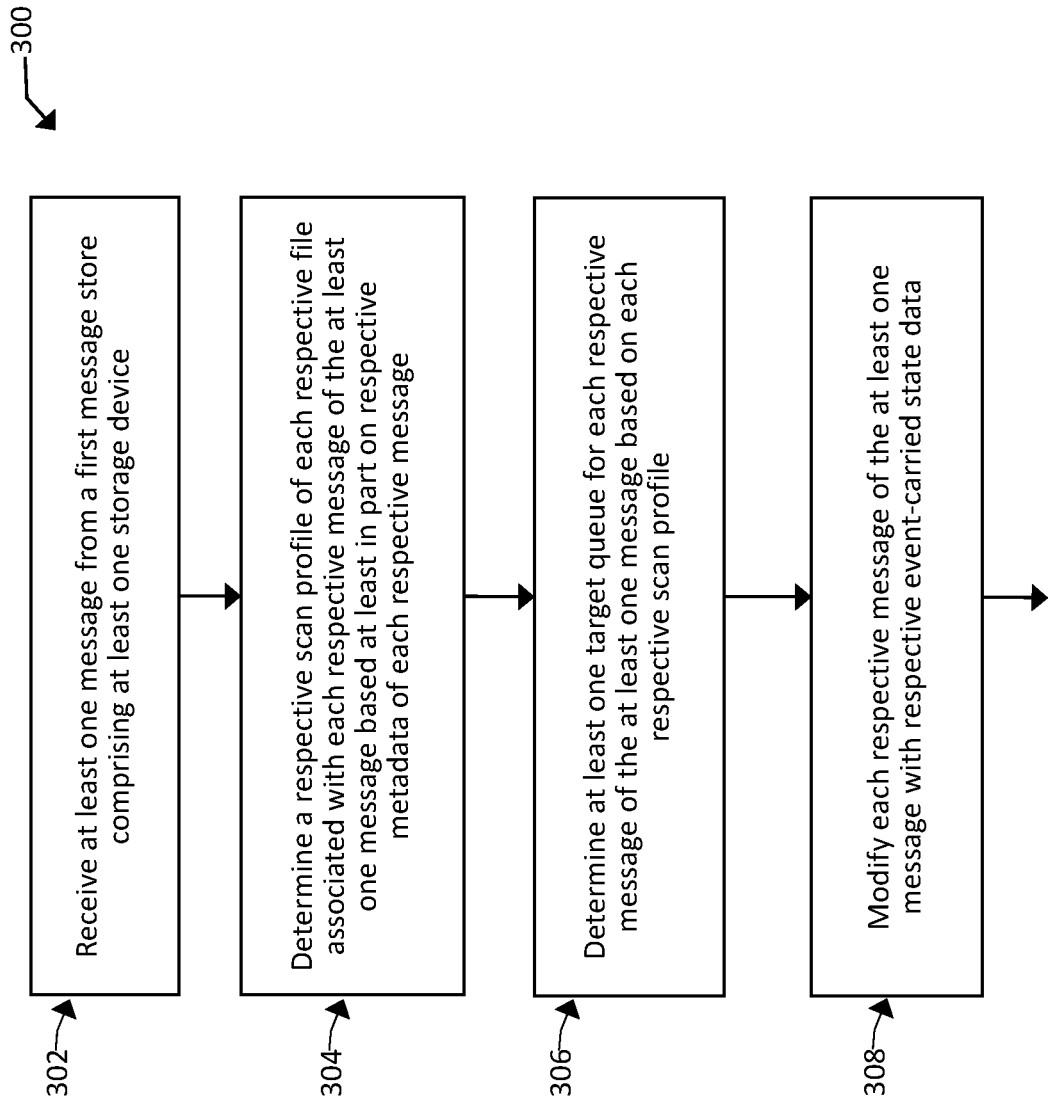
FIGS. 3A-3B are flowcharts illustrating an example of a method for providing automated early-stage application security monitoring, consistent with examples of aspects of at least some embodiments of the present disclosure.
Figure 3B:
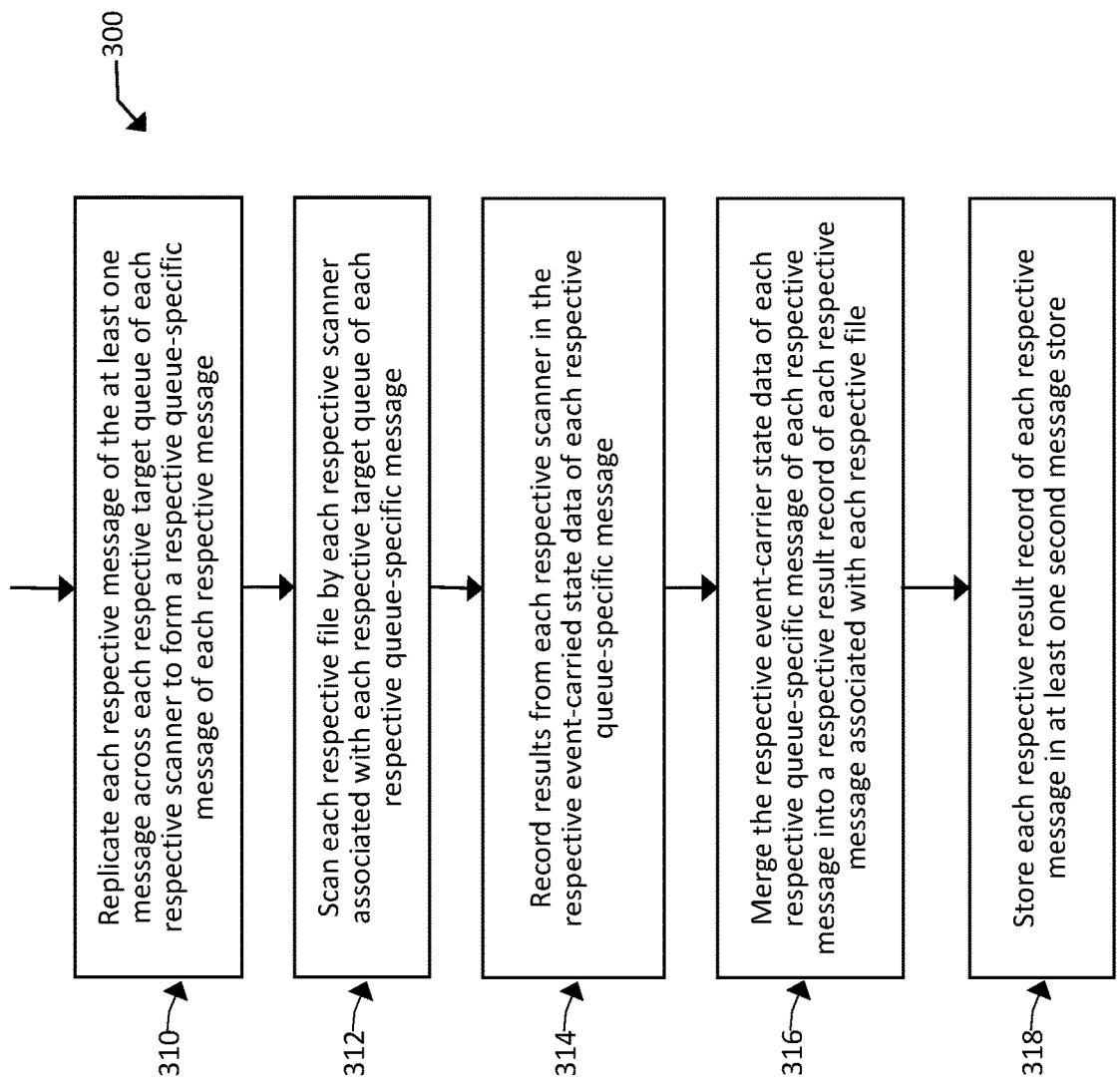

FIGS. 3A-3B are flowcharts illustrating an example of a method for providing early-stage application security monitoring, consistent with examples of aspects of at least some embodiments of the present disclosure. For example, in FIG. 3A-3B, the process 300 can be implemented to provide the results of the early-stage application security monitoring for allowing users (e.g., application developers) to make decisions at the early-stage of the application development through monitoring, alerting, and reporting processes.

At step 302, the event gateway 101 associated with worker services 106a-106n can receive at least one message from a first message store 110a-110n comprising at least one storage device. For example, each message can comprise a file identifier identifying a file stored in a central cache. In some embodiments, each message can comprise metadata associated with the file. In some embodiments, the event gateway 101 associated with worker services 106a-106n can receive at least one message from a first message store 110a-110n via at least one plug-in adapter 107a-107n. For example, the plug-in adapter can include a RabbitMQ plug-n-play adapter. In some embodiments, the plug-in adapter can include a MongoDB plug-n-play adapter. In some other embodiments, the plug-in adapter can include an Apache Kafka plug-n-play adapter.

At step 304, the event gateway 101 associated with worker services 106a-106n can determine a scan profile of each file associated with each message of the at least one message based at least in part on the metadata of each message. For example, each scan profile can comprise file type data identifying a file type associated with the file. In some embodiments, each scan profile can comprise file properties data identifying properties of the file. In some other embodiments, each scan profile can comprise scan type data identifying scan types associated with scanning the file. The scan types may be used to declare which scanners (e.g., implemented in worker services 106a-106n) to execute for the file.

At step 306, the event gateway 101 associated with worker services 106a-106n can determine, by the at least one processor, at least one target queue for each message of the at least one message based on each scan profile. For example, each target queue can be associated with a scanner of at least one scanner for scanning the file associated with each message.

At step 308, the event gateway 101 associated with worker services 106a-106n can modify each message of the at least one message with event-carried state data.

At step 310, the event gateway 101 associated with worker services 106a-106n can replicate each message of the at least one message across each target queue of each scanner to form a queue-specific message of each message.

At step 312, the event gateway 101 associated with worker services 106a-106n can scan each file by each scanner associated with each target queue of each queue-specific message. For example, the scanning by the event gateway 101 associated with worker services 106a-106n can be executed on a per-file-per-commit basis. In some embodiments, the scanner can comprise a FaaS.

In some embodiments, the event gateway 101 associated with worker services 106a-106n can report a number of automated pull requests made to fix vulnerabilities. In some other embodiments, the event gateway 101 associated with worker services 106a-106n can report a number of automated pull requests accepted by a user. In some embodiments, the event gateway 101 associated with worker services 106a-106n can report a number of opened requests to fix vulnerabilities were. In some other embodiments, the event gateway 101 associated with worker services 106a-106n can report a number of rejected automated pull requests. In some embodiments, the event gateway 101 associated with worker services 106a-106n can report a number of automated pull requests made to add any missing license. For example, a worker service 103a-103n may identify software license types or software license types not approved for a particular type of usage (e.g., enterprise, commercial, governmental, etc.) or where a software license is not declared. The worker service 103a-103n may then determine and report the number of automated pull requests made in response to identification of these software license issues. In some other embodiments, the event gateway 101 associated with worker services 106a-106n can report a number of requests made to fix sensitive data. In some embodiments, the reporting of the scan results can be provided on a file, commit, author, branch and tag level. Herein, a commit refers to a set of changes to files, e.g., of the source code of a software program, application or package, made by an author. Herein, an author refers to the developer that submitted the commit. Herein, a branch refers to a duplicated instance of a file or set of files of, e.g., source code of a software program, application or package to facilitate parallel changes to the file or set of files by multiple authors for later merging. Herein, a tag refers to a textual label associated with a specific revision or set of changes to, e.g., a source code of a software program, application or package.

For example, the event gateway 101 associated with worker services 106a-106n can generate a trend report for sensitive data. In some embodiments, the event gateway 101 associated with worker services 106a-106n can generate reports for open-source vulnerabilities. In some other embodiments, the event gateway 101 associated with worker services 106a-106n can generate reports for certificate usage across, e.g., an enterprise, or other entity or entity type. In some embodiments, the event gateway 101 associated with worker services 106a-106n can report vulnerability at each revision level of source code. In some other embodiments, the event gateway 101 associated with worker services 106a-106n can report real-time trend reports demonstrating a user committing code and vulnerabilities introduced at the revision level.

For example, the event gateway 101 associated with worker services 106a-106n can detect vulnerabilities in static application code. In some embodiments, the event gateway 101 associated with worker services 106a-106n can analyze quality of source code. In some other embodiments, the event gateway 101 associated with worker services 106a-106n can automate security testing. For example, the event gateway 101 associated with worker services 106a-106n can scan network or infrastructure security. In some embodiments, the event gateway 101 associated with worker services 106a-106n can consume application deployment events. For example, the event gateway 101 associated with worker services 106a-106n can scan system images, such as Open Container Initiative Image Format images of a containerized system including a docker image, or other system images and combinations thereof, to discover vulnerable layers.

In some embodiments, the event gateway 101 associated with worker services 106a-106n can map source code to application running on infrastructure. In some other embodiments, the event gateway 101 associated with worker services 106a-106n can identify unused applications. In some embodiments, the event gateway 101 associated with worker services 106a-106n can determine a security posture or state of an application.

At step 314, the event gateway 101 associated with worker services 106a-106n can record results from each scanner in the event-carried state data of each queue-specific message.

At step 316, the event gateway 101 associated with worker services 106a-106n can merge the event-carried state data of each queue-specific message of each message into a composite result record of each message associated with each file.

At step 318, the event gateway 101 associated with worker services 106a-106n can store each result record of each message in at least one second message store.

In some embodiments, the event gateway 101 associated with worker services 106a-106n can further determine an intelligent routing for each message of the at least one message. For example, the intelligent routing can comprise determining which worker service 106a-106n should be called with a message, calling a worker service; sending messages to at least one or more worker services; determining a subsequent action that should be taken based on a response from a worker service; determining whether to resend failed messages, determining how many retries are permitted for a failed message and time-outs where the worker service is prevented from further attempts to execute a task after a period of time, determining when to send a failed message to a dead-letter queue; de-duplicating messages; delaying messages, limiting the flow of messages; publishing the result from the worker service to the same message store or a different message store; or a combination thereof. In some embodiments, retries and time-outs are implemented both within the event gateway 101, and within each worker service 106a-106n to form a tiered check, as an optimization to mitigate potential network latency against failed task executions.

In some embodiments, the event gateway 101 associated with worker services 106a-106n can further analyze the event-carried state data in each message for security vulnerabilities relating to a user; generate a report of the security vulnerabilities relating to the user; and cause to display a visualization of the report of the security vulnerabilities on a screen of at least one computing device.

For example, the event gateway 101 associated with worker services 106a-106n can further identify the use of open-source components. In some embodiments, the event gateway 101 associated with worker services 106a-106n can further identify the use of inner-source data. In some other embodiments, the event gateway 101 associated with worker services 106a-106n can further identify the presence of sensitive data. For example, the sensitive data identified further comprises personal, protected, or confidential information associated with a user, company, developer, governmental organization, non-profit organization, or other entity, as well as end-users that use services provided by the entity.

In some embodiments, the event gateway 101 associated with worker services 106a-106n can further monitor open-source dependencies associated with the at least one file; compare the monitored open-source dependencies against a vulnerability database and identify safe versions; and generate a request to update the dependency to the safest version.

In some embodiments, the event gateway 101 associated with worker services 106a-106n can scan a digital certificate and store a unique name of a certificate issuer; a serial number assigned by certification authority to a certificate; a fingerprint comprising a hash digest representation of a binary form of a given certificate; a subject alternative name comprising additional host names for a single certificate; signature algorithm comprising algorithm used to sign the certificate; signature algorithm strength; validity (e.g., a validity period including a usable or effective data range of the certificate); severity (e.g., as determined from a predetermined policy such as a company policy and derived from various details in relation to the policy (such as strength, validity, etc.)); details of each certificate; status of each certificate further comprising whether the certificate is expired/unexpired; number of unique issuers identified from all certificates discovered; number of unique certificates from all certificates discovered; Chain of Trust, which ensures authenticity of the discovered certificate; among others. In some embodiments, the event gateway 101 associated with worker services 106a-106n can classify the signature algorithm as strong, weak, or unknown based on certain security standards. In some embodiments, signature algorithm strength refers to resistance to cryptanalytic attacks based on, but not limited to, known algorithms which are compromised, and an algorithm's ability to ensure enough entropy (difficult to guess) and data integrity. In some other embodiments, the event gateway 101 associated with worker services 103a-103n can specify an artificial validity time interval separate from the validity described above. For example, the worker services 103a-103n may impose an artificial valid time interval based on predefined policies (e.g., company security policies, industry best practices, etc.) during which the certificate is expected to be valid.

Figure 4:
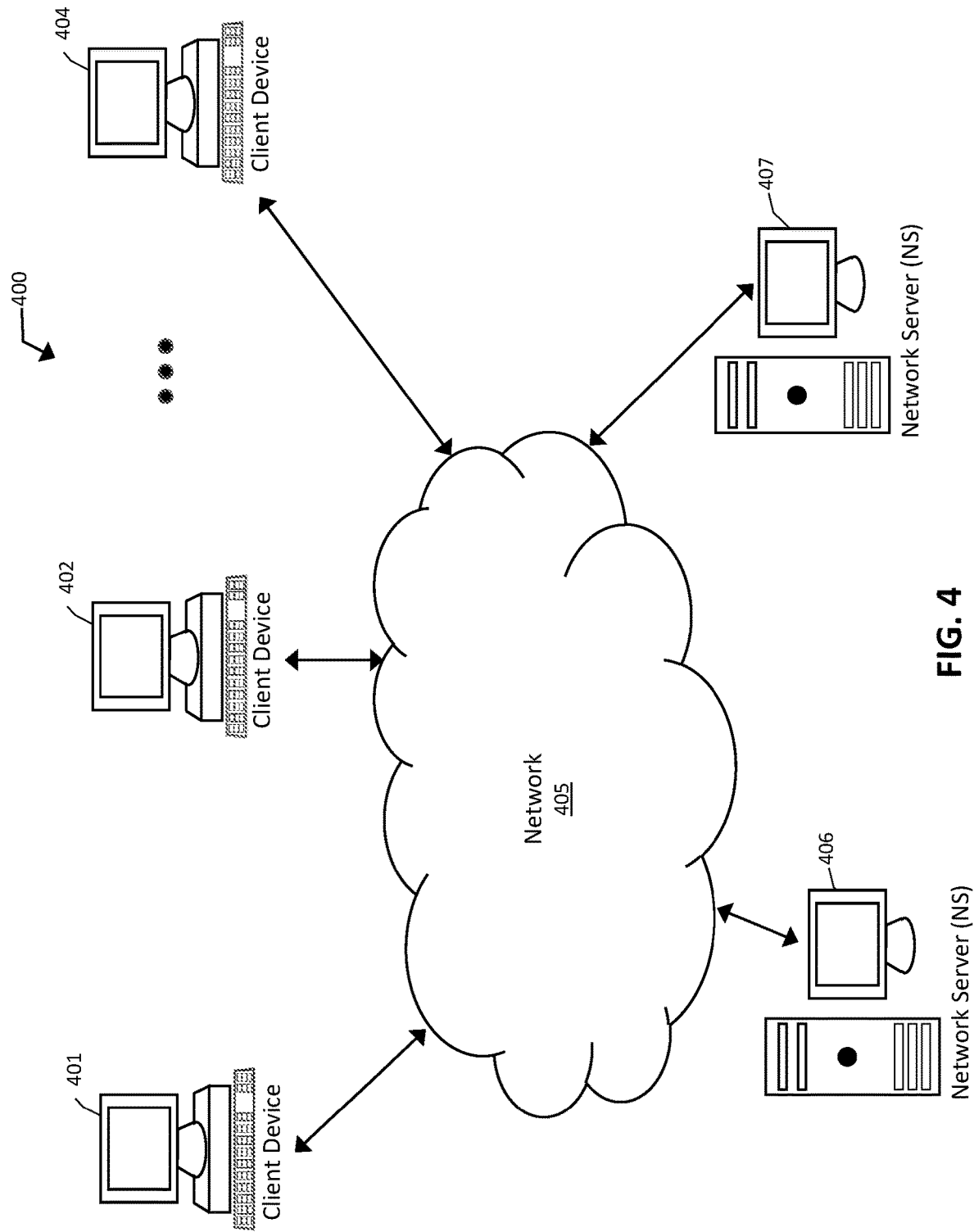
FIG. 4 is a block diagram depicting an example of a computer-based system and platform, in accordance with one or more embodiments of the present disclosure.

FIG. 4 depicts a block diagram of an example of computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the example of computing devices and/or the example of computing components of the examples of computer-based system/platform 400 may be configured to manage many members and/or concurrent transactions, as detailed herein. In some embodiments, the example of computer-based system/platform 400 may be based on a scalable computer and/or network architecture that incorporates various strategies for assessing the data, caching, searching, and/or database connection pooling. An example of scalable architecture is an architecture that is capable of operating multiple servers.

In some embodiments, referring to FIG. 4, members 401-404 (e.g., clients) of an example of computer-based system/platform 400 may include virtually any computing device capable of receiving and sending a message over a network (e.g., cloud network), such as network 405, to and from another computing device, such as servers 406 and 407, each other, and the like. In some embodiments, the member devices 401-404 may be personal computers, multiprocessor systems, microprocessor-based or programmable consumer electronics, network PCs, and the like. In some embodiments, one or more member devices within member devices 401-404 may be devices that are capable of connecting using a wired or wireless communication medium such as a PDA, POCKET PC, wearable computer, laptop, tablet, desktop computer, netbook, video game device, pager, smart phone, ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 401-404 may include and may run one or more applications, such as Internet browsers, mobile applications, voice calls, video games, videoconferencing, and email, among others. In some embodiments, one or more member devices within member devices 401-404 may be configured to receive and to send web pages, and the like. In some embodiments, an example of an specifically programmed browser application of the present disclosure may be configured to receive and display graphics, text, multimedia, and the like, employing virtually any web based language, including, but not limited to Standard Generalized Markup Language (SGML), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 401-404 may be specifically programmed by either Java, .Net, QT, C, C++ and/or other suitable programming language. In some embodiments, one or more member devices within member devices 401-404 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the example of the network 405 may provide network access, data transport and/or other services to any computing device coupled to it. In some embodiments, the network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the network 410 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the network 405 may include and implement, as an alternative or in conjunction with one or more of the above, a WiMAX architecture defined by the WiMAX forum. In some embodiments and, optionally, in combination of any embodiment described above or below, the network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the network 405 may be transmitted based at least in part on one or more communication modes such as, but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the network 405 may also include mass storage, such as network attached storage (NAS), a storage area network (SAN), a content delivery network (CDN) or other forms of computer or machine-readable media.

In some embodiments, the example of the server 406 or the server 407 may be a web server (or a series of servers) running a network operating system, examples of which may include but are not limited to Microsoft Windows Server, Novell NetWare, or Linux. In some embodiments, the server 406 or the server 407 may be used for and/or provide cloud and/or network computing. Although not shown in FIG. 4, in some embodiments, the server 406 or the server 407 may have connections to external systems like email, SMS messaging, text messaging, ad content providers, etc. Any of the features of the server 406 may also be implemented in the server 407 and vice versa.

In some embodiments, one or more of the servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-based servers for users of the member computing devices 401-404.

In some embodiments and, optionally, in combination of any embodiment described above or below, for example, one or more computing member devices 401-404, the server 406, and/or the server 407 may include a specifically programmed software module that may be configured to send, process, and receive information using a scripting language, remote procedure call, email, tweet, Short Message Service (SMS), Multimedia Message Service (MMS), instant messaging (IM), internet relay chat (IRC), mIRC, Jabber, application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
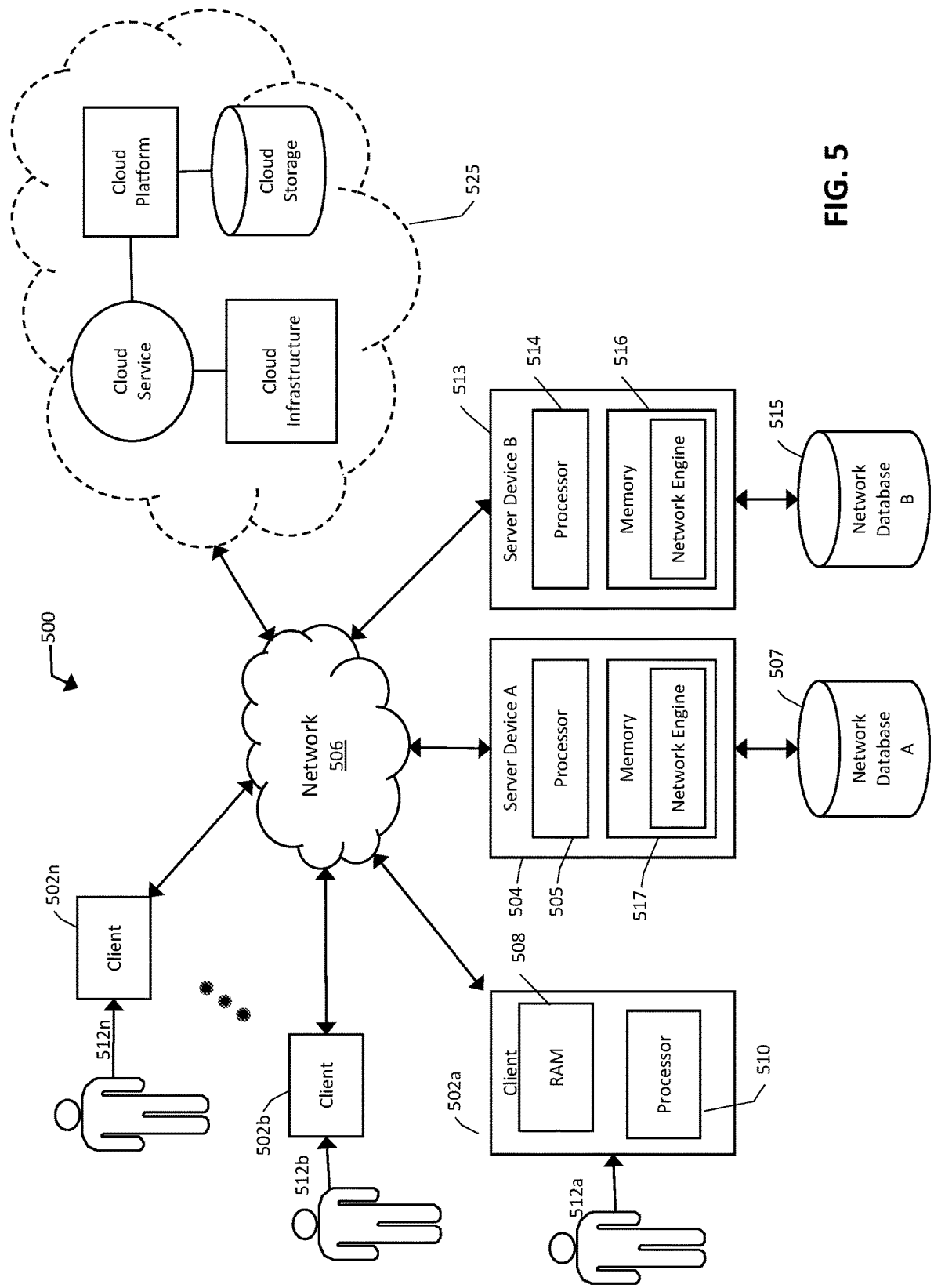
FIG. 5 is a block diagram depicting another example of a computer-based system and platform, in accordance with one or more embodiments of the present disclosure.

FIG. 5 depicts a block diagram of another example of computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b through 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, ASIC, configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users 512a through 502n may communicate over the example of the network 206 with each other and/or with other systems and/or devices coupled to the network 506. As shown in FIG. 5, the example of server devices 504 and 513 may also be coupled to the network 506. In some embodiments, one or more member computing devices 502a through 502n may be mobile clients.

In some embodiments, at least one of databases 507 and 515 may be any type of database, including a database managed by a database management system (DBMS). In some embodiments, an example of DBMS-managed database may be specifically programmed as an engine that controls organization, storage, management, and/or retrieval of data in the database. In some embodiments, the DBMS-managed database may be specifically programmed to provide the ability to query, backup and replicate, enforce rules, provide security, compute, perform change and access logging, and/or automate optimization. In some embodiments, the DBMS-managed database may be chosen from Oracle® database, IBM® DB2, Adaptive Server® Enterprise, FileMaker®, Microsoft® Access, Microsoft® SQL Server®, MySQL™, PostgreSQL, and a NoSQL implementation. In some embodiments, the DBMS-managed database may be specifically programmed to define each schema of each database in the DBMS, according to a database model of the present disclosure which may include a hierarchical model, network model, relational model, object model, or some other suitable organization that may result in one or more applicable data structures that may include fields, records, files, and/or objects. In some embodiments, the DBMS-managed database may be specifically programmed to include metadata about the data that is stored.

Figure 6:
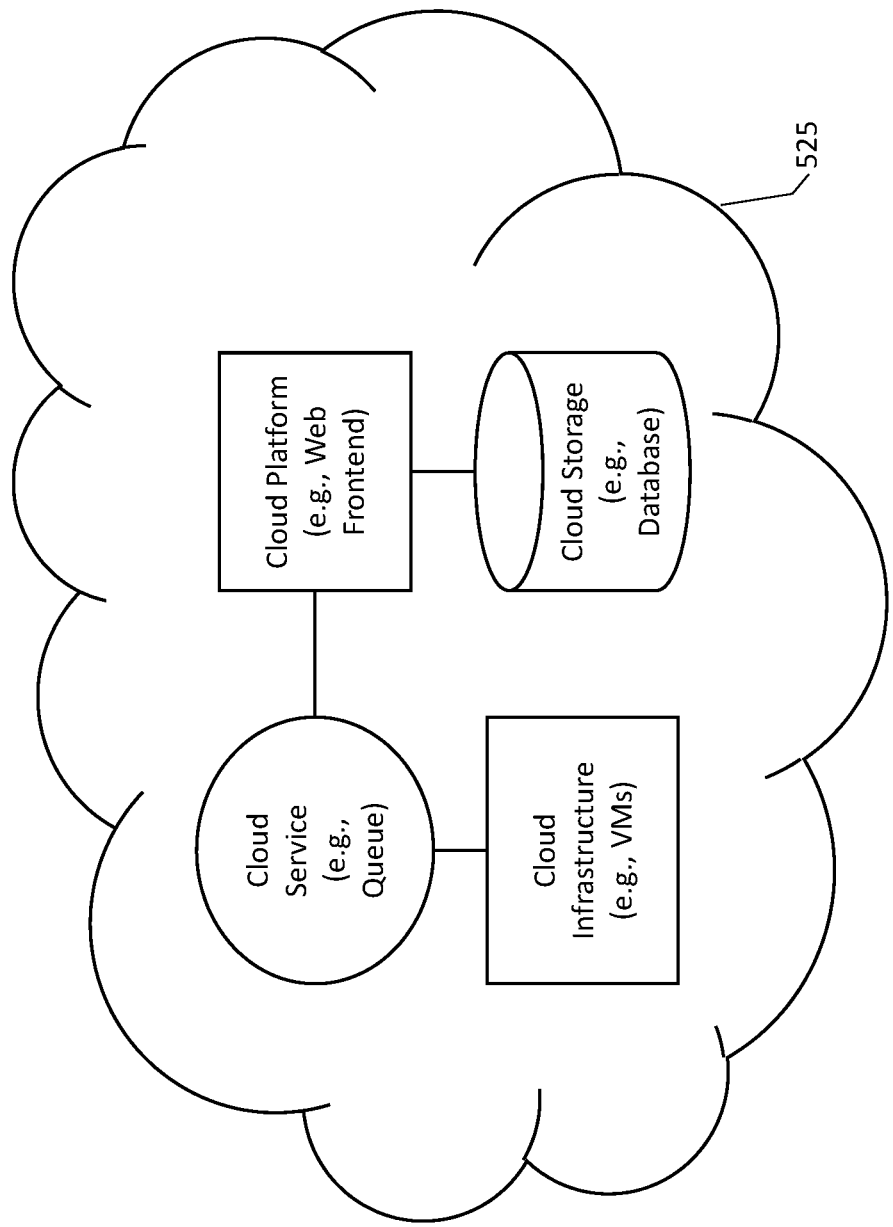
FIGS. 6 and 7 are diagrams illustrating two examples of implementations of cloud computing architecture/aspects with respect to which the disclosed technology may be specifically configured to operate, in accordance with one or more embodiments of the present disclosure.
Figure 7:
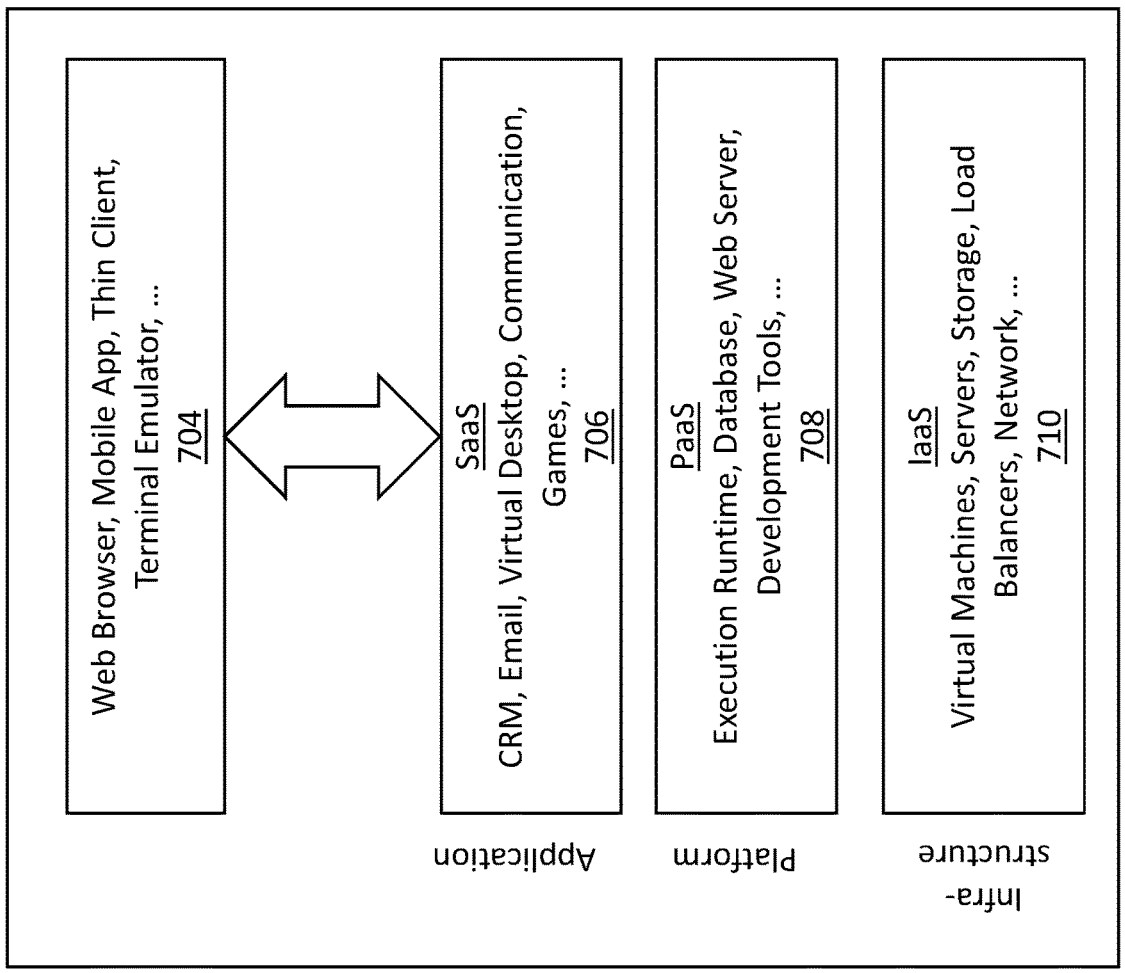

As also shown in FIGS. 6 and 7, some embodiments of the disclosed technology may also include and/or involve one or more cloud components 525, which are shown grouped together in the drawing for the sake of illustration, though may be distributed in various ways as known in the art. Cloud components 525 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

According to some embodiments shown by way of one example in FIG. 7, the example of computer-based systems/platforms, the computer-based devices, components and media, and/or the computer-implemented methods of the present disclosure may be specifically configured to operate in or with cloud computing/architecture such as, but not limited to: infrastructure as a service (IaaS) 710, platform as a service (PaaS) 708, and/or software as a service (SaaS) 706. FIGS. 6 and 7 illustrate examples of schematics of implementations of the cloud computing/architecture(s) in which the example of computer-based systems/platforms, the computer-implemented methods, and/or the computer-based devices, components and/or media of the present disclosure may be specifically configured to operate. In some embodiments, such cloud architecture 706, 708, 710 may be utilized in connection with the web browser and browser extension aspects, shown at 704, to achieve the innovations herein.

Throughout the specification, the following terms take the meanings explicitly associated herein, unless the context clearly dictates otherwise. The phrases "in one embodiment" and "in some embodiments" as used herein do not necessarily refer to the same embodiment(s), though it may.

Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" or "near real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process. In some embodiments, events and/or actions in accordance with the present disclosure can be in real-time, near real-time, and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the term "dynamically" and term "automatically," and their logical and/or linguistic relatives and/or derivatives, mean that certain events and/or actions can be triggered and/or occur without any human intervention.

In some embodiments, programmed computing systems with associated devices can be configured to operate in the distributed network environment, communicating with one another over one or more suitable data communication networks (e.g., the Internet) and utilizing one or more suitable data communication protocols.

In some embodiments, the material disclosed herein may be implemented in hardware and software or firmware or a combination of them or as instructions stored on a non-transitory machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); RAM; magnetic disk storage media; optical storage media; flash memory devices, and others. In some embodiments, the non-transitory machine-readable medium can include one or more storage devices, and memory devices described above.

Examples of hardware elements may include processors, microprocessors, circuits, circuit elements (e.g., transistors, resistors, capacitors, inductors, and so forth), integrated circuits, Application Specific Integrated Circuits (ASIC), Programmable Logic Devices (PLD), Digital Signal Processors (DSP), Field Programmable Gate Array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or Central Processing Unit (CPU). In various implementations, the one or more processors may be dual-core processor(s), dual-core mobile processor(s), and so forth.

Computer systems, and systems, as used herein, can include any combination of hardware and software. Examples of software may include software components, programs, applications, operating system software, firmware, software modules, routines, subroutines, functions, methods, procedures, software interfaces, Application Programming Interfaces (API), computer code, data, data variables, or any combination thereof that can be processed by a computing device as computer-executable instructions.

In some embodiments, one or more of computer-based systems of the present disclosure may include or be incorporated, partially or entirely into at least one Personal Computer (PC), laptop computer, tablet, portable computer, smart device (e.g., smart phone, smart tablet or smart television), Mobile Internet Device (MID), messaging device, data communication device, server computer, and so forth.

In some embodiments, computer-based systems of the present disclosure may be configured to utilize hardwired circuitry and/or hardware components that may be used in place of or in combination with software instructions to implement features consistent with principles of the disclosure. Thus, implementations consistent with principles of the disclosure are not limited to any specific combination of hardware circuitry or hardware components and/or software.

In some embodiments, software specifically programmed in accordance with one or more principles of the present disclosure may also be available as a client-server software application, or as a web-enabled software application. For example, software specifically programmed in accordance with one or more principles of the present disclosure may also be embodied as a software package installed on a hardware device.

In some embodiments, computer-based systems of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000. As used herein, the term "user" shall have a meaning of at least one user At least some aspects of the present disclosure will now be described with reference to the following numbered clauses.

1. A method comprising:
    receiving, by a processor, at least one message from a first message store comprising at least one storage device;
    determining, by the processor, a scan profile of each file associated with each message of the at least one message based at least in part on metadata of each message;
    determining, by the at least one processor, at least one target queue for each message of the at least one message based on each scan profile;
        wherein each target queue is associated with a scanner of at least one scanner for scanning the file associated with each message;
    modifying, by the processor, each message of the at least one message with event-carried state data;
    replicating, by the processor, each message of the at least one message across each target queue of each scanner to form a queue-specific message of each message;

scanning, by the processor, each file by each scanner associated with each target queue of each queue-specific message;

recording, by the processor, results from each scanner in the event-carried state data of each queue-specific message;

merging, by the processor, the event-carried state data of each queue-specific message of each message into a result record of each message associated with each file; and storing, by the processor, each result record of each message in at least one second message store.

2. The method of clause 1, wherein each message comprises a file identifier identifying a file stored in a central cache, and metadata associated with the file.

3. The method of clause 1, wherein each scan profile comprises file type data identifying a file type associated with the file, file properties data identifying properties of the file, scan type data identifying scan types associated with scanning the file, or a combination thereof.

4. The method of clause 1, wherein the processor receives at least one message from a first message store via at least one plug-in adapter.

5. Any method of clauses 1 to 4, wherein the at least one plug-in adapter is a RabbitMQ plug-n-play adapter.

6. Any method of clauses 1 to 4, wherein the at least one plug-in adapter is a MongoDB plug-n-play adapter.

7. Any method of clauses 1 to 4, wherein the at least one plug-in adapter is an Apache Kafka plug-n-play adapter.

8. Any method of clauses 1 to 4, further comprising determining, by the processor, an intelligent routing for each message of the at least one message, and wherein the intelligent routing further comprises:
   (i) determining which worker service should be called with a message;
   (ii) calling a worker service;
   (iii) sending messages to at least one or more worker services;
   (iv) determining a subsequent action that should be taken based on a response from a worker service;
   (v) determining whether to resend failed messages;
   (vi) determining how many retries are permitted for a failed message;
   (vii) determining a time-out duration for a failed message;
   (viii) determining when to send a failed message to a dead-letter queue;
   (ix) de-duplicating messages;
   (x) delaying messages;
   (xi) limiting the flow of messages;
   (xii) publishing the result from the worker service to the same message store or a different message store; or
   (xiii) a combination thereof 9. Any method of clauses 1 to 4, wherein the method further comprises:
   analyzing, by the processor, the event-carried state data in each message for security vulnerabilities relating to a user;
   generating, by the processor, a report of the security vulnerabilities relating to the user;
   publishing, by the processor, the report to application programming interface (APIs) and message queues for unrelated applications to access; and
   causing to display, by the processor, a visualization of the report of the security vulnerabilities on a screen of at least one computing device.

10. The method of clause 9, further comprising identifying, by the processor, the use of open-source components.

11. The method of clause 9, further comprising identifying, by the processor, the use of inner-source components.

12. The method of clause 9, further comprising identifying, by the processor, the use of sensitive data.

13. The method of clause 12, wherein the sensitive data identified further comprises personal, protected, or confidential information associated with an entity.

14. The method of clause 10, wherein the method further comprises:
    monitoring, by the processor, open-source dependencies associated with the at least one file;
    comparing the monitored open-source dependencies against a vulnerability database and identifying safe versions; and
    generating a request to update the dependency to the safest version.

15. The method of clause 1, wherein scanning, by at least one processor, is executed on a per-file-per-commit basis.

16. The method of clause 1, wherein the at least one scanner comprises a Function-as-a-Service ("FaaS") scanner.

17. The method of clause 1, wherein reporting of the scan results is provided on a file, commit, author, branch, or tag level.

18. A non-transitory computer storage medium storing instructions which, when executed by a computing device, cause the computing device to perform a method, the method comprising:
    receiving, by at least one processor, at least one message from a first message store comprising at least one storage device;
    determining, by the processor, a scan profile of each file associated with each message of the at least one message based at least in part on metadata of each message;
    determining, by the processor, at least one target queue for each message of the at least one message based on each scan profile;
    wherein each target queue is associated with a scanner of at least one scanner for scanning the file associated with each message;
    modifying, by the processor, each message of the at least one message with event-carried state data;
    replicating, by the processor, each message of the at least one message across each target queue of each scanner to form a queue-specific message of each message;
    scanning, by the processor, each file by each scanner associated with each target queue of each queue-specific message;
    recording, by the processor, results from each scanner in the event-carried state data of each queue-specific message;
    merging, by the processor, the event-carried state data of each queue-specific message of each message into a result record of each message associated with each file; and
    storing, by the processor, each result record of each message in at least one second message store.

19. The non-transitory computer storage medium of clause 18, wherein the processor receives at least one message from a first message store via at least one plug-in adapter.

20. A system comprising:
one or more processors; and
a non-transitory computer-readable medium including one or more sequences of instructions that, when executed by one or more processors, causes:
receiving, by at least one processor, at least one message from a first message store comprising at least one storage device;
determining, by the processor, a scan profile of each file associated with each message of the at least one message based at least in part on metadata of each message;
determining, by the processor, at least one target queue for each message of the at least one message based on each scan profile;
wherein each target queue is associated with a scanner of at least one scanner for
scanning the file associated with each message;
modifying, by the processor, each message of the at least one message with event-carried state data;
replicating, by the processor, each message of the at least one message across each target queue of each scanner to form a queue-specific message of each message;
scanning, by the processor, each file by each scanner associated with each target queue of each queue-specific message;
recording, by the processor, results from each scanner in the event-carried state data of each queue-specific message;
merging, by the processor, the event-carried state data of each queue-specific message of each message into a result record of each message associated with each file; and
storing, by the processor, each result record of each message in at least one second message store.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the methodologies, the systems/platforms, and the devices described herein can be utilized in any combination with each other. Further still, the various steps may be carried out in any desired order (and any desired steps may be added and/or any desired steps may be eliminated).

What is claimed is:

1. A method, comprising:
identifying application source code that has been committed to a repository;
scanning one or more functions of the application source code to identify a data file retrieved by the one or more functions, wherein the application source code implements the data file when executing the one or more functions;
retrieving metadata corresponding to the data file;
determining that the metadata indicates that the data file has been designated as sensitive data;
in response to the determining, generating a security vulnerability alert on a graphical user interface (GUI) dashboard;
scanning the one or more functions of the application source code to determine a number of automated data pull requests; and
automatically implementing a fix for the security vulnerability based on the automated data pull requests.

2. The method of claim 1, further comprising:
determining a number of rejected requests from the number of automated data pull requests; and
reporting the number of rejected requests on the GUI dashboard.

3. The method of claim 2, wherein determining the number of rejected requests further comprises:
determining that an automated data pull request is prohibited by a software license.

4. The method of claim 1, further comprising:
scanning the one or more functions of the application source code to identify a second data file retrieved by the one or more functions;
determining that the second data file relies on an open-source dependency;
comparing the open-source dependency against a vulnerability database to identify a safe version of the open-source dependency; and
generating a request on the GUI dashboard to update the open-source dependency to the safe version of the open-source dependency.

5. The method of claim 1, further comprising:
updating the GUI dashboard to include a trend report indicating a number of detected security vulnerabilities corresponding to respective instances of revised versions of the application source code.

6. The method of claim 5, wherein the number of detected security vulnerabilities corresponds to a number of accesses instances of data files designated as sensitive data.

7. The method of claim 1, further comprising:
determining that the application source code uses a public key certificate;
computing a fingerprint corresponding to the public key certificate, wherein the fingerprint includes a hash digest representation of the public key certificate;
determining that second application source code uses the public key certificate by scanning the second application source code to identify a certificate with a matching fingerprint; and
in response to determining that the second application source code uses the public key certificate, generating a second security vulnerability alert on the GUI dashboard.

8. A system, comprising:
a memory; and
at least one processor coupled to the memory and configured to:
identify application source code that has been committed to a repository on the memory;
scan one or more functions of the application source code to identify a data file retrieved by the one or more functions, wherein the application source code implements the data file when executing the one or more functions;
retrieve metadata corresponding to the data file;
determine that the metadata indicates that the data file has been designated as sensitive data;
in response to the determining, generate a security vulnerability alert on a graphical user interface (GUI) dashboard scan the one or more functions of the application source code to determine a number of automated data pull requests; and automatically implement a fix for the security vulnerability based on the automated data pull requests.

9. The system of claim 8, wherein the at least one processor is further configured to:

determine a number of rejected requests from the number of automated data pull requests; and report the number of rejected requests on the GUI dashboard.

10. The system of claim 9, wherein to determine the number of rejected requests, the at least one processor is further configured to:

determine that an automated data pull request is prohibited by a software license.

11. The system of claim 8, wherein the at least one processor is further configured to:

scan the one or more functions of the application source code to identify a second data file retrieved by the one or more functions;

determine that the second data file relies on an open-source dependency;

compare the open-source dependency against a vulnerability database to identify a safe version of the open-source dependency; and generate a request on the GUI dashboard to update the open-source dependency to the safe version of the open-source dependency.

12. The system of claim 8, wherein the at least one processor is further configured to:

update the GUI dashboard to include a trend report indicating a number of detected security vulnerabilities corresponding to respective instances of revised versions of the application source code.

13. The system of claim 12, wherein the number of detected security vulnerabilities corresponds to a number of accesses instances of data files designated as sensitive data.

14. The system of claim 8, wherein the at least one processor is further configured to:

determine that the application source code uses a public key certificate;

compute a fingerprint corresponding to the public key certificate, wherein the fingerprint includes a hash digest representation of the public key certificate;

determine that second application source code uses the public key certificate by scanning the second application source code to identify a certificate with a matching fingerprint; and in response to determining that the second application source code uses the public key certificate, generate a second security vulnerability alert on the GUI dashboard.

15. A non-transitory computer-readable medium having instructions stored thereon that, when executed by at least one computing device, cause the at least one computing device to perform operations comprising:

identifying application source code that has been committed to a repository;

scanning one or more functions of the application source code to identify a data file retrieved by the one or more functions, wherein the application source code implements the data file when executing the one or more functions;

retrieving metadata corresponding to the data file;

determining that the metadata indicates that the data file has been designated as sensitive data;

in response to the determining, generating a security vulnerability alert on a graphical user interface (GUI) dashboard;

scanning the one or more functions of the application source code to determine a number of automated data pull requests; and automatically implementing a fix for the security vulnerability based on the automated data pull requests.

16. The non-transitory computer-readable medium of claim 15, the operations further comprising:

determining a number of rejected requests from the number of automated data pull requests; and reporting the number of rejected requests on the GUI dashboard.

17. The non-transitory computer-readable medium of claim 16, wherein determining the number of rejected requests further comprises:

determining that an automated data pull request is prohibited by a software license.

18. The non-transitory computer-readable medium of claim 15, the operations further comprising:

scanning the one or more functions of the application source code to identify a second data file retrieved by the one or more functions;

determining that the second data file relies on an open-source dependency;

comparing the open-source dependency against a vulnerability database to identify a safe version of the open-source dependency; and generating a request on the GUI dashboard to update the open-source dependency to the safe version of the open-source dependency.

19. The non-transitory computer-readable medium of claim 15, the operations further comprising:

updating the GUI dashboard to include a trend report indicating a number of detected security vulnerabilities corresponding to respective instances of revised versions of the application source code.

20. The non-transitory computer-readable medium of claim 15, the operations further comprising:

determining that the application source code uses a public key certificate;

computing a fingerprint corresponding to the public key certificate, wherein the fingerprint includes a hash digest representation of the public key certificate;

determining that second application source code uses the public key certificate by scanning the second application source code to identify a certificate with a matching fingerprint; and in response to determining that the second application source code uses the public key certificate, generating a second security vulnerability alert on the GUI dashboard.

* * * * *

UNITED STATES PATENT AND TRADEMARK OFFICE
CERTIFICATE OF CORRECTION

| | | |
|---|---|---|
| PATENT NO. | : 11,895,142 B2 | Page 1 of 1 |
| APPLICATION NO. | : 18/086093 | |
| DATED | : February 6, 2024 | |
| INVENTOR(S) | : Soudhamma et al. | |

It is certified that error appears in the above-identified patent and that said Letters Patent is hereby corrected as shown below:

In the Specification

In Column 5, Line 7, delete "at" and insert -- At --, therefor.

In Column 17, Line 62, delete "Microsoft™" and insert -- Microsoft™, --, therefor.

In Column 21, Line 57, delete "thereof" and insert -- thereof. --, therefor.

In the Claims

In Column 24, Claim 7, Line 49, delete "GUI dashboard." and insert -- GUI-dashboard. --, therefor.

Signed and Sealed this
Eighth Day of April, 2025

Coke Morgan Stewart
*Acting Director of the United States Patent and Trademark Office*